United States Patent [19]

Gay et al.

[11] Patent Number: 4,689,178

[45] Date of Patent: Aug. 25, 1987

[54] METHOD FOR MAGNESIUM SULFATE RECOVERY

[75] Inventors: Richard L. Gay, Canoga Park; LeRoy F. Grantham, Calabasas, both of Calif.

[73] Assignee: Rockwell International Corporation, El Segundo, Calif.

[21] Appl. No.: 798,075

[22] Filed: Nov. 14, 1985

[51] Int. Cl.$^4$ .............................................. G21F 9/00
[52] U.S. Cl. ...................................... 252/626; 423/2; 423/18; 423/166
[58] Field of Search ................ 423/2, 18, 20, 166; 75/84.1 A, 84.4; 252/626

[56] References Cited

U.S. PATENT DOCUMENTS

| | | | |
|---|---|---|---|
| 2,733,126 | 1/1956 | Spiegler | 423/20 |
| 3,347,642 | 10/1967 | Thomas et al. | 423/20 |
| 3,920,788 | 11/1975 | Mercier et al. | 423/20 |
| 4,230,672 | 10/1980 | Divins et al. | 423/20 |
| 4,252,564 | 2/1981 | Barker et al. | 75/84.4 |
| 4,388,292 | 6/1983 | Palmer et al. | 423/2 |
| 4,412,861 | 11/1983 | Krenzmann | 423/20 |
| 4,423,007 | 12/1983 | Weir et al. | 423/2 |
| 4,564,507 | 1/1986 | Elliott | 423/5 |

*Primary Examiner*—Edward A. Miller
*Attorney, Agent, or Firm*—H. Fredrick Hamann; Harry B. Field; Clark E. DeLarvin

[57] ABSTRACT

A method of obtaining magnesium sulfate substantially free from radioactive uranium from a slag containing the same and having a radioactivity level of at least about 7000 pCi/gm. The slag is ground to a particle size of about 200 microns or less. The ground slag is then contacted with a concentrated sulfuric acid under certain prescribed conditions to produce a liquid product and a solid product. The particulate solid product and a minor amount of the liquid is then treated to produce a solid residue consisting essentially of magnesium sulfate substantially free of uranium and having a residual radioactivity level of less than 1000 pCi/gm. In accordance with the preferred embodiment of the invention, a catalyst and an oxidizing agent are used during the initial acid treatment and a final solid residue has a radioactivity level of less than about 50 pCi/gm.

13 Claims, No Drawings

METHOD FOR MAGNESIUM SULFATE RECOVERY

STATEMENT OF GOVERNMENT INTEREST

The Government has rights in this invention pursuant to Contract (or Grant) No. DE-AT03-83SF11948 awarded by the U.S. Department of Energy.

BACKGROUND OF THE INVENTION

1. Field of the Invention

Broadly, the present invention is directed to the volume reduction of a radioactive waste material. More specifically, the invention deals with the recovery of decontaminated magnesium sulfate from a slag obtained as a byproduct in the reduction of uranium tetrafluoride with metallic magnesium.

2. Description of the Prior Art

Enriched uranium metal (containing from 3 to 99+% of the 235 isotope) is a valuable source of fuel for use with nuclear reactors. In the production of such fuel it has been customary to react enriched uranium tetrafluoride with magnesium metal in an autoclave or retort. When the reaction is complete, the uranium metal is separated bodily from the slag which because of its lighter weight rises to the top of the molten uranium metal during the reaction. The slag will contain the free metals magnesium and uranium as well as oxides, fluorides or mixed oxides and fluorides of these metals. Because of its value as a fuel, various methods have been proposed for the recovery of the uranium from such slag. It has been proposed to contact such a slag at an elevated temperature with fluorine gas to recover the uranium as $UF_6$. Fluorine is, of course, both expensive and highly corrosive, thus making such a process complex and expensive.

In U.S. Pat. No. 2,733,126 it is proposed that the slag be crushed and roasted in air at a temperature between about 600° C. and 1000° C. and then subsequently treated at a temperature between 200° C. and 300° C. with concentrated sulfuric acid to react with the fluorides and expel fluorine as hydrogen fluoride, and convert the magnesium and uranium to sulfates. The uranium sulfate goes into solution in the acid and is separated for recovery of the valuable enriched uranium values therefrom.

U.S. Pat. No. 2,897,048 describes another process for the recovery of uranium from a magnesium fluoride slag containing the same. In accordance with the process disclosed therein, the slag is ground and roasted in air with sodium carbonate. Thereafter the roasted slag is neutralized with an acid and leached with an aqueous solution containing sodium bicarbonate to dissolve the uranium. A product liquor is produced which contains the uranium. The product liquor is separated from the residue and reacted with an alkali metal hydroxide to precipitate the uranium as diuranate.

The principal purposes of the foregoing processes are recovery of the valuable enriched uranium, but little consideration is given to the remaining radioactive residue.

Recently there has developed an interest in uranium metal for its metallurgical properties and the magnesium reduction process is being applied to large quantities of depleted uranium (less than about 0.3 wt % of the 235 isotope in the uranium). The resulting waste magnesium fluoride slag is contaminated with about 2 to 7 wt % uranium and has a radioactivity level of approximately 7000 pCi/gm. This is sufficient radioactivity for the material to be classified as a low-level radioactive waste. In view of the large quantities of such waste being generated and the drastic increases in radioactive waste disposal costs, a method of reducing the volume of such waste clearly is needed.

SUMMARY OF THE INVENTION

The present invention provides a method of obtaining magnesium sulfate substantially free of radioactive uranium and separately recovering hydrogen fluoride from a slag formed in the production of metallic uranium by the reduction of uranium tetrafluoride with metallic magnesium in a retort. Typically there is produced a slag containing, among other things, free magnesium and uranium metal as well as the oxides, fluorides, and mixed oxides and fluorides of such metals. In addition, the slag will typically have a radioactivity level of at least about 7000 pCi/gm (pico Curies/gram). The method comprises certain sequential steps which will produce a magnesium sulfate product essentially free of any uranium and having a radioactivity level of less than about 1000 pCi/gm. Indeed, it is a particular advantage of the present invention that it is possible to produce such a magnesium sulfate product which will have a radioactivity level of less than about 50 pCi/gm, and thus it may be stored in a commercial dump without regard to its radioactivity level.

The first step of the invention comprises grinding the slag to a median particle size of about 200 microns or less. The ground slag is then contacted in a reaction zone with concentrated sulfuric acid substantially free of water for a time of from about 1 to 10 hours. The reaction zone is maintained at a temperature within the range of from about 100° to 300° C. and the weight ratio of slag to acid is within the range of from about 1:2 to 1:100. The reaction between the concentrated sulfuric acid and slag produces uranium sulfate in solution and a solid magnesium sulfate precipitate. Concurrently there is evolved gaseous hydrogen fluoride.

Following the first acid treatment, the next step comprises separating a major amount of the solution from the precipitate and adding water to the separate precipitate and a minor amount of the liquid in an amount sufficient to provide a solution comprising from about 50 to 75% by weight sulfuric acid to dissolve the magnesium sulfate precipitate and any remaining uranium. Thereafter the solution so produced is boiled to evaporate water and reprecipitate magnesium sulfate. The liquid containing the dissolved uranium is separated from the solids and the reprecipitated magnesium sulfate may be recovered and will have a radioactivity level of less than about 1000 pCi/gm and generally less than about 50 pCi/gm.

OBJECTS OF THE INVENTION

It is an object of the invention to provide a process for the recovery of magnesium sulfate substantially free of radioactivity from a radioactive magnesium-uranium fluoride slag.

It is another object of the invention to provide a method of recovering magnesium sulfate from a magnesium-uranium fluoride slag without the necessity of any preoxidation or roasting step.

It is also an object of the invention to provide a method for the separate recovery of the fluorine values from a magnesium-fluoride slag.

It is a further object of the invention to provide a method of recovering magnesium sulfate from a radioactive magnesium-uranium fluoride slag in which the magnesium sulfate product has a sufficiently low radioactivity level that it may be disposed of without nuclear restrictions.

It is also an object of the invention to provide a method of reducing the volume of a radioactive magnesium fluoride slag whereby the cost of disposal and storage is substantially reduced.

It is also an object of the invention to provide a method for the recovery of uranium from a magnesium-uranium fluoride slag in which a pure uranium product is obtainable substantially free of any impurities.

These and other objects of the invention will be more apparent from the following detailed description.

DETAILED DESCRIPTION OF THE INVENTION

The present invention provides a method of treating a radioactive slag formed in the production of metallic uranium by the reduction of uranium tetrafluoride with metallic magnesium in a retort which substantially reduces the volume of material requiring storage in a radioactive waste disposal site. The method also provides for the recovery of magnesium sulfate substantially free of radioactive uranium from such a slag. Typically, such a slag will contain free magnesium and uranium metal as well as oxides and fluorides of such metals. Such slags generally have a uranium content of about 2 to 7 wt % of the slag of which less than about 0.3 wt % of the uranium will consist of the 235 isotope, the balance comprising urainum 238. Such a slag will have a radioactivity level of about 7000 pCi/gm or higher. The method of the present invention comprises a series of sequential treatment steps.

In accordance with the method of the present invention, the slag of the type above described is first pulverized or ground to a median particle size of about 200 microns or less. Larger sizes may be treated in accordance with the present invention, however the penalty is that a longer time is required for the subsequent acid treatments. Alternatively of course, smaller sizes will decrease the time to some extent, however, the economic penalty incurred in reducing the size is generally not offset by the time saved. The preferred particle size therefore for practice of the present invention is about 200 microns. The manner in which the slag is crushed or ground is not particularly critical, thus it has been found that either wet or dry ball milling are equally effective. Other pulverization or grinding processes will also be apparent to those skilled in the art and are equally applicable.

It is an advantage of the present invention that the ground material does not require any high temperature oxidation treatments such as roasting in the presence of air along with the attendant cost incurred therewith. Rather, the ground material may be treated as is. The second sequential step of the method of the present invention involves reacting the ground slag with a concentrated sulfuric acid substantially free of water. Typically the acid will have a concentration in excess of 98.5 and preferably in excess of 99%. A small amount of water may be tolerated since it will inhibit the evolution of gaseous sulfur compounds.

In the second step an oxidizer and a catalyst may be used to further enhance the separation of radioactive uranium from the magnesium fluoride. Only a catalytic amount of iron is required, thus amounts as small as about 0.01 wt % based on the total weight of acid and slag are sufficient to catalyze the desired reactions. An oxidizer also may be added during the acid treatment step. The particularly preferred oxidizing agent is manganese dioxide. The amount of oxidizing agent is selected to convert all of the uranium in the slag to a hexavalent state. The exact quantity will, of course, vary depending upon the particular slag utilized. However, such determination is readily within the skill of one versed in the art.

The concentrated acid and slag react evolving the hydrogen fluoride gas which may be readily recovered, condensed and compressed for later use. Alternatively, the hydrogen fluoride gas product may be subjected to electrolysis to separately recover fluorine as a saleable product. There also is produced a liquid product comprising uranium sulfate in solution with the acid and a particulate solid precipitate principally comprising magnesium sulfate. The concentrated sulfuric acid and slag are maintained in contact with one another in the reaction zone for a time of from about 1 to 10 hours. However, substantially complete reaction is obtainable in a time of from about 1 to 3 hours. The temperature within the reaction zone is not particularly critical and may be as high as about the boiling point of the sulfuric acid. However, to avoid evolution of gaseous sulfur compounds it generally is preferred to maintain the temperature within the range of from about 100° to 300° C. The weight ratio of slag to acid also may vary widely. Thus the weight ratio may range from as low as from about 1:2 to as high as 1:100. However, in the interest of economy it generally is preferred to maintain the slag to acid ratio within the range of from about 1:2 to 1:4.

Following acid treatment a major amount of the uranium sulfate-containing acid solution is separated from the precipitate. Advantageously, the precipitate is washed with clean acid. Thereafter water is added to the separated precipitate (and acid contained therein) to provide a solution comprising from about 50 to 75% by weight sulfuric acid. Under such conditions the magnesium sulfate is dissolved in the solution along with any remaining uranium.

The solution of magnesium sulfate and acid plus any uranium sulfate is then boiled to evaporate water. Removal of water results in the formation of a concentrated acid solution with the corresponding precipitation of the magnesium sulfate (the uranium sulfate remaining in solution). The reprecipitated magnesium sulfate is then recovered free of any uranium and having a radioactivity level of less than about 1000 pCi/gm and typically less than 50 pCi/gm. The acid solution containing any minor amounts of uranium may then be used for the initial treatment of ground slag. In addition, the liquid product which will contain substantially all of the radioactive uranium values, may be subsequently treated to separately recover the uranium therefrom. Such separation is readily accomplished utilizing known technology, for example, ion exchange, sodium carbonate precipitation or the like. Obviously the separated uranium will occupy substantially less volume than the original slag, thus minimizing its storage cost in a controlled facility. The magnesium sulfate will have a sufficiently low radioactivity level that it may be disposed of as a nonradioactive waste.

The following example will more clearly illusstate the practice of the invention. The following procedure was utilized.

EXAMPLE

An amount of pulverized magnesium fluoride waste slag was placed in beakers of concentrated sulfuric acid having a nominal purity of about 98.5% (specific gravity 1.84). The vessels were placed on hot plates and the mixture stirred while it was maintained at a temperature within the range of from about 200° to 210° C. for a time of about 10 hours. The reaction mixture was filtered or decanted to separate precipitated magnesium sulfate crystals from the resultant uranyl sulfate-sulfuric acid solution. This was followed by an acid wash with concentrated sulfuric acid. Water was then added to the crystals in an amount to provide a solution comprising 25 to 50 wt% sulfuric acid to dissolve the crystals and any remaining uranium. Thereafter the solution was boiled at a temperature of from about 200° to 210° C. for a time of about ½ hour to recrystalize or reprecipitate the magnesium sulfate. The results are set forth in the table below.

TABLE

DECONTAMINATION OF MAGNESIUM FLUORIDE SLAG BY ACID CONVERSION TO MAGNESIUM SULFATE

| Particulate Size (μm) | Percent Activity Removed | Activity (pCi/g) Initial | Activity (pCi/g) Final |
|---|---|---|---|
| Starting Size | | | |
| 38-150 | 95 | 5850 | 280 |
| 38-150 | 96 | 6020 | 270 |
| Reprecipitated Size | | | |
| Unknown | 93* | 280 | 20 |
| Unknown | 92* | 270 | 22 |

*Total percent activity removed in both precipitations was 99.7 and 99.6 respectively.

From the foregoing table it is seen that in the initial acid treatment the radioactivity of the magnesium fluoride product is reduced to substantially less than 1000 pCi/gm. Indeed in the two tests shown, the activity was less than 500 pCi/gm which is a lower limit of concern under present regulations with respect to disposal of radioactive waste. Further, it will be seen that following the second crystallization the radioactivity level is reduced to less than about 50 pCi/gm which approaches the natural background level of ordinary dirt. Thus this product is suitable for disposal in a nonradioactive disposal site under current regulations or indeed even any presently contemplated regulations. Further, the radioactive uranium which initially comprised only from about 2 to 7 wt % of the slag is now in a form in which it is readily recoverable using conventional techniques. Thus this example also demonstrates the efficacy of the present invention to reduce the volume of waste which must be disposed of in a controlled radioactive waste site.

While the foregoing invention has been described with respect to what is now considered to be the preferred embodiment, it will be understood that it should not be limited to the details given herein, that it may be modified within the scope of the appended claims.

What is claimed and desired to be secured by Letters Patent of the United States is:

1. A method of recovering magnesium sulfate substantially free of radioactive uranium and separately recovering hydrogen fluoride from a slag formed in the production of metallic uranium by the reduction of uranium tetrafluoride with metallic magnesium in a retort wherein there is produced a slag containing magnesium, uranium and oxides and fluorides of said metals, said slag having a radioactivity of at least about 7000 pCi/gm, which method comprises the sequential steps of;

(a) grinding said slag to a median particle size of less than about 200 microns;

(b) introducing said ground slag into a reaction zone into contact with sulfuric acid substantially free of water for a time sufficient to produce a uranium sulfate solution and a solid magnesium sulfate precipitate, said reaction zone being maintained at a temperature within the range of from about 100°-300° C., the weight ratio of slag to acid being within the range of from about 1:2 to 1:100, and said time being within the range of from about 1 to 10 hours;

(c) separating a major amount of the solution from the precipitate;

(d) adding water to the separate precipitate in an amount sufficient to provide a solution comprising from about 50 to 75% by weight sulfuric acid to dissolve the precipitate and any remaining uranium;

(e) boiling the solution of step (d) to evaporate water and reprecipitate magnesium sulfate; and (f) recovering said reprecipitated magnesium sulfate from step (e) free of any uranium and having a radioactivity level of less than about 1000 pCi/gm.

2. The method of claim 1 wherein said slag contains depleted uranium comprising less than about 0.3 wt.% of the 235 isotope and the balance of the uranium consists essentially of the 238 isotope.

3. The method of claim 1 wherein said sulfuric acid has a purity in excess of about 99%.

4. The method of claim 1 wherein said acid treatment in step (b) is conducted at a temperature of about the boiling point of the sulfuric acid.

5. The method of claim 1 wherein said slag is treated without a prior oxidation treatment.

6. The method of claim 1 wherein hydrogen fluoride is evolved during step (b) and is separately recovered.

7. The method of claim 6 wherein said hydrogen fluoride is subsequently treated to separately recover the hydrogen and fluorine.

8. A method of recovering magnesium sulfate substantially free of radioactive uranium and separately recovering hydrogen fluoride from the slag formed in the production of metallic uranium by the reduction of uranium tetrafluoride with metallic magnesium in a retort wherein there is produced a slag containing magnesium, uranium and oxides and fluorides of said metals, said slag having a radioactivity of at least about 7000 pCi/gm, which method consists essentially of the sequential steps of;

(a) grinding said slag to a median particle size of less than about 200 microns;

(b) introducing said ground slag into a reaction zone into contact with sulfuric acid substantially free of water for a time sufficient to produce a uranium sulfate solution and a solid magnesium sulfate precipitate. Said reaction zone being maintained at an elevated temperature and the weight ratio of slag to acid being within the range of from about 1:2 to 1:10;

(c) separating a major amount of the solution from the precipitate;

(d) adding water to the separate precipitate in an amount sufficient to provide a solution comprising from about 50 to 75% by weight sulfuric acid to dissolve the precipitate and any remaining uranium;

(e) boiling the solution of step (d) to evaporate water and reprecipitate magnesium sulfate and;

(f) recovering said reprecipitated magnesium sulfate from step (e) free of any uranium and having a radioactivity level of less than about 1000 pCi/gm.

9. The method of claim 8 wherein said time in step (b) is within the range of from about 1 to 4 hours.

10. The method of claim 9 wherein said slag contains depleted uranium comprising less than about 0.3 wt % of the 235 isotope and the balance of the uranium consists essentially of the 238 isotope.

11. The method of claim 9 wherein said sulfuric acid has the purity in excess of about 99%.

12. The method of claim 10 wherein hydrogen fluoride is evolved during step (b) and is separately recovered.

13. The method of claim 11 wherein said hydrogen fluoride is subsequently retreated to separately recover the hydrogen and fluorine.

* * * * *